(12) United States Patent
Character

(10) Patent No.: US 10,082,213 B1
(45) Date of Patent: Sep. 25, 2018

(54) CHECK VALVE FLOOR DRAIN

(71) Applicant: Alvin J. Character, Maple Heights, OH (US)

(72) Inventor: Alvin J. Character, Maple Heights, OH (US)

(*) Notice: Subject to any disclaimer, the term of this patent is extended or adjusted under 35 U.S.C. 154(b) by 0 days.

(21) Appl. No.: 15/648,758

(22) Filed: Jul. 13, 2017

(51) Int. Cl.
| E03C 1/298 | (2006.01) |
| F16K 15/04 | (2006.01) |
| E03C 1/22 | (2006.01) |
| F16K 27/02 | (2006.01) |

(52) U.S. Cl.
CPC ........... *F16K 15/04* (2013.01); *E03C 1/22* (2013.01); *E03C 1/298* (2013.01); *F16K 27/0209* (2013.01)

(58) Field of Classification Search
CPC . F16K 15/04; A47K 1/14; E03C 1/298; E03C 1/28; E03C 1/282; E03C 1/26; E03C 1/262; E03C 1/29; E03C 1/292; F16L 17/035; F16J 15/121
USPC ...... 220/203.1, 827; 215/342, 341; 277/618; 4/286–295
See application file for complete search history.

(56) References Cited

U.S. PATENT DOCUMENTS

| 1,379,501 A | * | 5/1921 | Wilson | A47K 1/14 |
| | | | | 4/293 |
| 2,380,443 A | * | 7/1945 | Ingie | B65D 45/28 |
| | | | | 215/290 |
| 2,699,555 A | * | 1/1955 | Green | E03C 1/26 |
| | | | | 137/550 |
| 5,161,806 A | * | 11/1992 | Balsells | F16J 15/027 |
| | | | | 267/1.5 |
| 5,201,340 A | * | 4/1993 | Teepe | B65D 88/747 |
| | | | | 137/315.01 |
| 2010/0319115 A1 | * | 12/2010 | Childs | E03F 5/04 |
| | | | | 4/293 |
| 2016/0176588 A1 | * | 6/2016 | Perry, Jr. | B65D 41/023 |
| | | | | 220/324 |

* cited by examiner

*Primary Examiner* — Janie Loeppke
(74) *Attorney, Agent, or Firm* — Daniel M. Cohn; Howard M. Cohn

(57) ABSTRACT

A system and method for inserting removable drain valve within an inlet opening of a drain basin and then sealing the drain valve within the drain basin. The removable drain valve has a cylindrical housing with a check valve disposed with an outlet of the drain basin to allow drain water to flow out from the outlet of the drain basin while blocking flow from the outlet of the drain basin to the inlet of the drain basin.

20 Claims, 8 Drawing Sheets

CHECK VALVE FLOOR DRAIN

FIELD OF THE INVENTION

The present invention relates to a check valve floor drain and more particularly to a check valve floor drain adapted to be installed into a floor drain.

RELATED APPLICATION

This Application relates to U.S. application Ser. No. 14/644,566, entitled CHECK VALVE FLOOR DRAIN, filed on Mar. 11, 2015, to the same inventor.

BACKGROUND OF THE INVENTION

In the developed world, sewers are usually pipelines that begin with connecting pipes from buildings to one or more levels of larger underground trunk mains, which transport the sewage to sewage treatment facilities. Sewers are generally gravity powered, though pumps may be used if necessary. Pipes conveying sewage or other water carried waste from an individual building to a common gravity sewer line are called laterals. Branch sewers typically run under streets receiving laterals from buildings along that street and discharge by gravity into trunk sewers at manholes.

When a sewage line from a building becomes clogged or overloaded, sewage within the line may back up and flood the inside of the building. Sewer water backing up into a building can cause a great deal of damage. The water can do serious damage and may require total remodeling if an area used for living is damaged. Sewer backup can be the result of a variety of causes, but whatever the cause, the results can be devastating. Therefore, there is a need for an emergency backflow system which can utilize a backflow system existing in a building.

It is customary in lower floors of buildings to provide a drain in the floor for conducting water or other liquids to the sewer. Frequently, water collects in basements as a result of washing the floor or seepage through the walls. The floor is usually built at a slope to allow the water to flow by gravity to the drain. The common drain consists of a cover plate having a plurality of holes to strain out solids and to allow the water to flow through to a bowl which is attached at the bottom to a drain line which connects to a sewer line. Such drains work satisfactorily for floors which are relatively high with relation to the main sewer line. In some cases, however, the sewer line may become overloaded or blocked causing water to back up in the drain line to such an extent that the floor becomes flooded.

Heretofore, various means have been used to prevent back up water from the sewer line to flow through the drain and onto the floor within the building. These prior art devices have often been unduly expensive or have certain disadvantages which make their safety and dependability uncertain. For example, a back water valves have been inserted in the pipe below the drain bowl. One such valve is a ball type mechanism which is forced by the backup water against the underside of the bowl to close the bowl opening. Also, a plug with a stem for inserting and removing has been forced into the drain pipe to close the pipe. Such back up water valves or plugs are not always dependable as solids may lodge between them and the pipe so that they do not seat properly or they become loose whereby their usefulness is impaired.

Currently, the floor drain in addition to the role of drainage to meet outside, it needs to be able to put the living space and plumbing systems are separated so that odor and overflow will not run up the pipeline as an important component of residential drainage systems, floor drain performance a direct impact on indoor air quality, and human health are closely related.

These and other objects and advantages of the invention will become apparent from the following description and from the accompanying drawings which illustrate one embodiment of the invention.

SUMMARY OF THE INVENTION

According to an embodiment of the present invention, there is provided a removable drain valve for insertion within an inlet opening of a drain basin. The removable drain valve has a cylindrical housing and cage with a check valve. The removable drain valve is disposed with an outlet of the drain basin to allow drain water to flow out from the outlet of the drain basin while blocking flow from the outlet of the drain basin to the inlet opening of the drain basin. A circular spring is formed of a length of spring wire. The circular spring has two circular loops, one at either end of the spring wire which are adapted for a user's fingers to be inserted to pull the two loops towards each other so that the diameter of the circular spring is reduced whereby outer walls of the cylindrical housing can be squeezed into a contracted condition when the cylinder housing is inserted into the drain basin and pressed against the interior inner wall of the drain basin. The two loops can return to their normal position whereby the diameter of circular spring is increased and thereby causes the cylindrical housing to expand into an expanded condition and seal against the drain basin.

According to another embodiment of the present invention, there is disclosed a removable drain valve for insertion within an inlet opening of a drain basin. The removable drain valve has a cylindrical housing and cage with a check valve. The removable drain valve is disposed with an outlet of the drain basin to allow drain water to flow out from the outlet of the drain basin while blocking flow from the outlet of the drain basin to the inlet opening of the drain basin. A circular spring formed of a strip of spring wire has a circular loop at either end of the strip of spring wire. The circular loops are adapted for a user to insert their fingers to pull the two loops towards each other so that the diameter of the circular spring is reduced whereby outer walls of the cylindrical housing can be squeezed into a contracted condition when the cylinder housing is inserted into the drain basin and pressed against the interior inner wall of the drain basin. The two loops can return to their normal position whereby the diameter of circular spring is increased and thereby causes the cylindrical housing to expand into an expanded condition and seal against the drain basin.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

Figure 1:
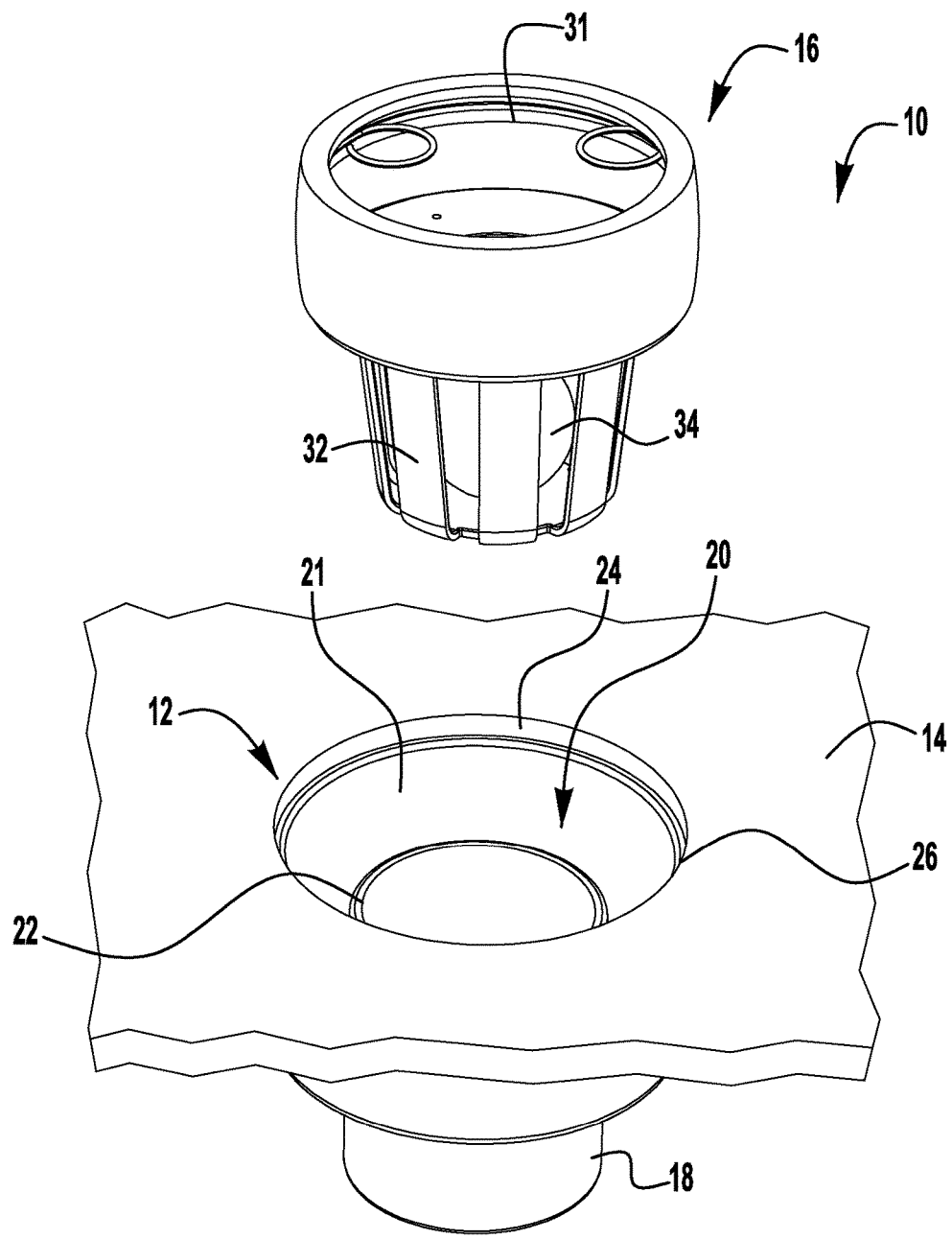
FIG. 1 is a three-dimensional, side view of a check valve floor drain disposed above the floor drain into which it will be mounted, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

A basic problem with residential and commercial plumbing systems is the back flow of sewage and drain water into the plumbing fixtures of a sewage generating facility due to a blockage or an obstruction of the sewer line. This problem is amplified where the sewage generating facility comprises an apartment building, an office building, or a similar multi-unit structure having a large number of drain fixtures therein. Hospitals, food handling or food service establishments and like structures are of particular concern because the back flow of any sewage into such facilities presents even greater opportunity for serious health hazards. Such flooding is not only unsanitary but can cause considerable damage to the building and contents therein.

Referring to FIG. 1, there is illustrated a floor drain assembly 10 including a floor drain 12 disposed in a floor 14, such as a building floor, a basement, a garage floor, an exterior paved area and the like and a removable drain valve 16 designed to be removably insertable within a drain basin 20. The removable drain valve 16 is provided to prevent water backflow, trap water evaporation and sewer gas seepage through the drain basin 20 disposed within the floor drain 12 while still allowing free drainage function through a standard size drain pipe 18 extending downward from the outlet 22 of the drain basin 20. The drain pipe 18 is a pipe or tube that acts as a conduit between a house (or business) and the sewer system. The removable drain valve 16 can be removed from its operative location within interior sidewall 21 of the drain basin 20 for cleaning, inspection, testing, and repair of the floor drain assembly 10. The drain valve 16 may be constructed of any material, such as plastic or stainless steel for corrosion resistance. Typically, a grate cover or strainer (not shown) is seated within a groove 24 formed around the inlet 26 of the drain basin 20. The strainer is preferably placed atop the drain basin 20 within the groove 24, such that it is flush with the surface of floor 14. The purpose of the strainer is to strain or filter out solid debris within drain water before the latter flows through the removable drain valve 16 disposed in the drain basin 20 to avoid damage to the removable drain valve and other parts of the sewer system.

Figure 2:
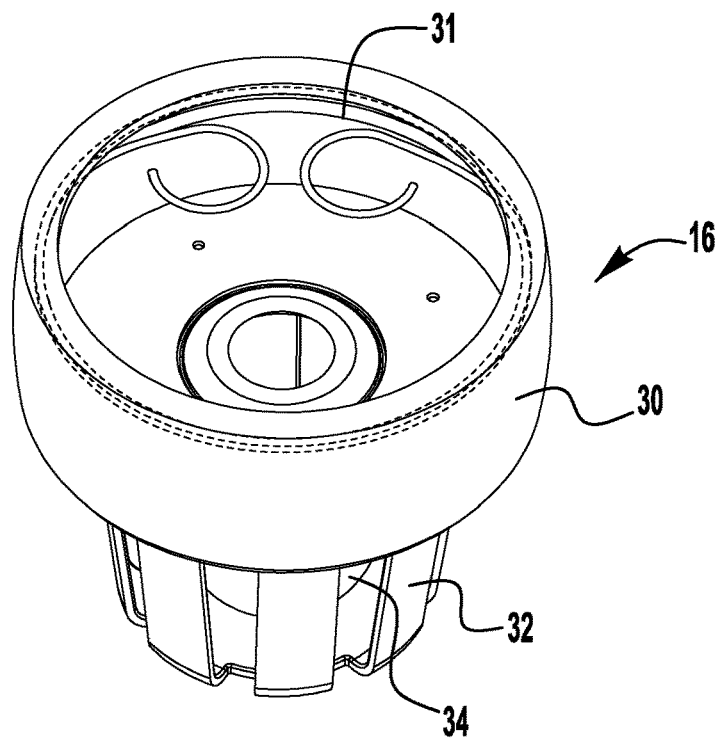
FIG. 2 is a front, three-dimensional side view of the check valve floor drain in an open condition, in accordance with the present invention.
Figure 6:
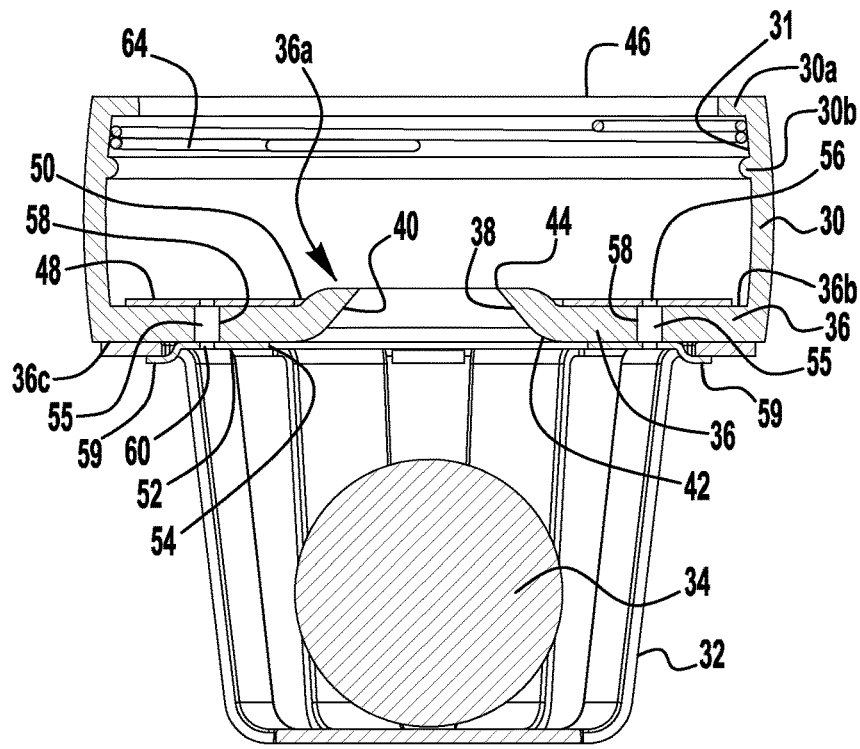
FIG. 6 is a side, cross sectional view through line 6-6 of FIG. 5, in accordance with the present invention.

Referring to FIG. 2, there is illustrated the removable drain valve 16 in a contracted state so as to be able to be inserted within the drain basin 20 adjacent the interior wall 21. Removable drain valve 16 includes a cylindrical housing 30 and a cage 32 containing a ball valve 34 adapted to be inserted within the outlet 22 of the drain basin 20. The cage is mounted to the base portion 36 of the cylindrical housing, as shown in FIG. 6. Referring to FIG. 1, the cage 32 and ball valve 34 are received in the outlet 22 of the drain basin 20 and projects downward toward the drain pipe 18 when the cylindrical housing is disposed in the drain basin 20.

As seen in FIG. 6, the base portion 36 of the cylindrical housing 30 includes a base wall having a central opening 38 extending therethrough. The central opening 38 has a conical shaped wall 40 with an outer opening 42 that is larger than an inner opening 44 facing the inlet 46 of the housing 30. The ball valve 34 can either seat against the conical shaped wall 40 or at the intersection of the conical shaped wall and the outer opening 42.

Figure 4:
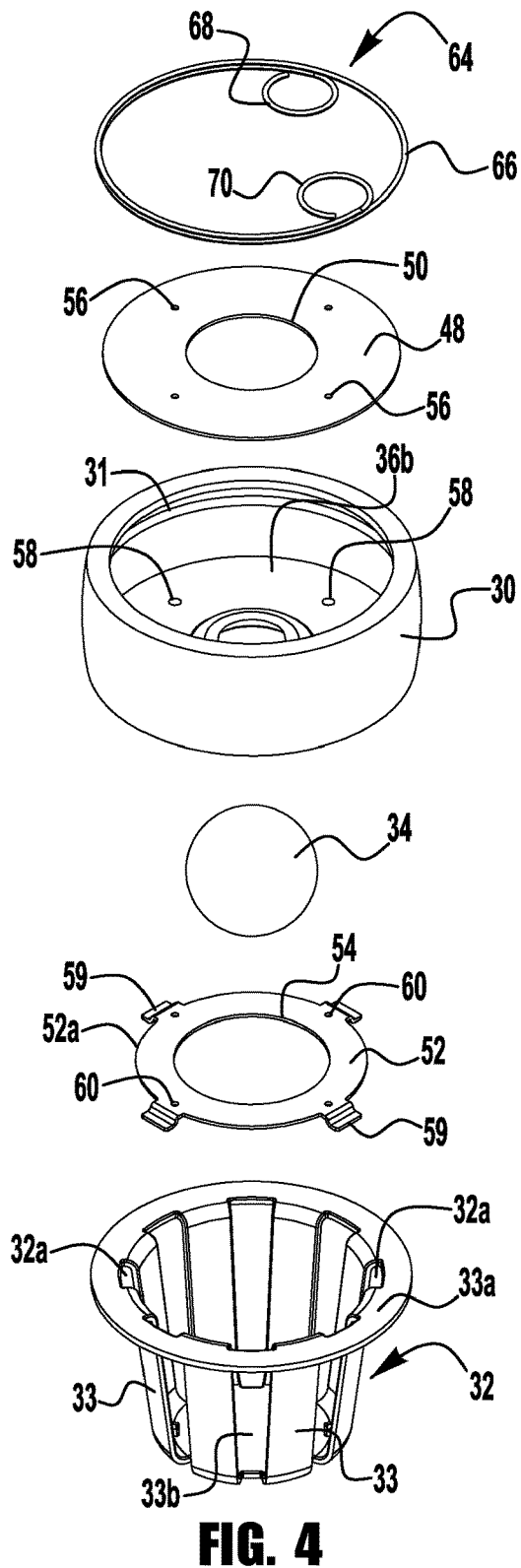
FIG. 4 is a side three-dimensional, exploded view of the check valve floor drain, in accordance with the present invention.
Figure 5:
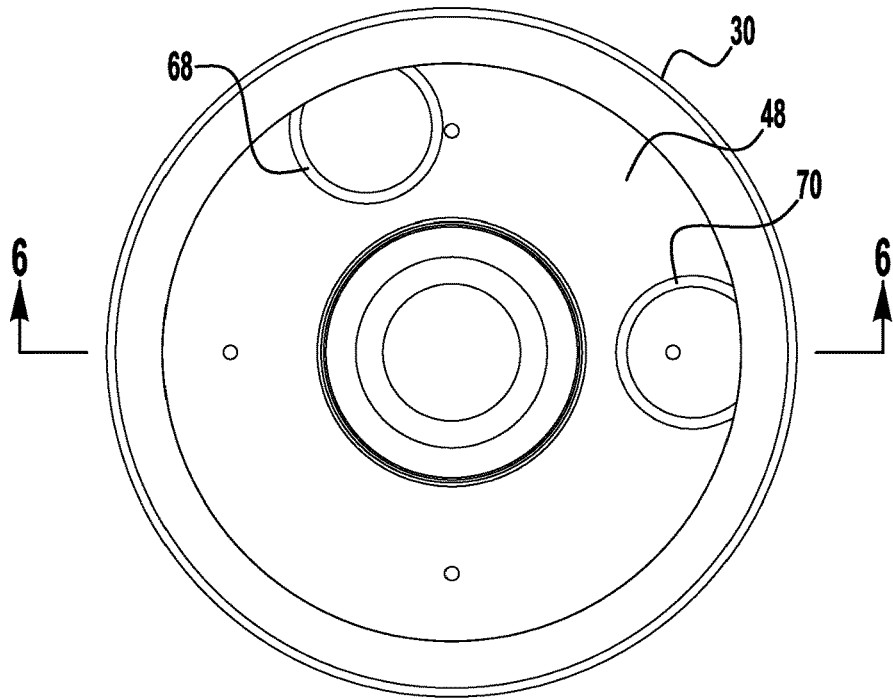
FIG. 5 is a top view of the check valve floor drain in a closed condition, in accordance with the present invention.

As seen in FIGS. 4 and 5, a circular plate 48 has central opening 50 which receives the portion 36a of the base wall 36 that projects above the surface 36b of the base wall. An attachment plate 52 having a central opening 54 is mounted against the outer surface 36c of the base wall 36 by any means such as rivets 55, as seen in FIG. 6, that are placed in a plurality of openings 56 through circular plate 48, a plurality of openings 58 through the base wall 36, and a plurality of openings 60 through attachment plate 52. The circular plate 48 and the attachment plate 52, strengthen and stiffen the base wall 36 to prevent any buckling when the ball valve 34 is seated against either the conical shaped wall 40 or at the intersection of the conical shaped wall and the outer opening 42.

The attachment plate 52 has a plurality of tabs 59 that extend outward from the outer edge 52a of the attachment plate and are sized to be received within notches 32a formed between the spaced walls 33 interconnecting the outer, circular shaped cage wall 33a and the bottom 33b which supports the ball 34 when it is not seated against cylindrical shaped wall 40, as shown in FIG. 6. When the cylindrical housing 30 is constructed, the attachment plate 52 is connected to the circular plate 48 with means such as rivets 55, as seen in FIG. 5, and the tabs 59 secure the cage 32 onto the housing 30.

The ball valve 34 acts as a check valve that normally allows fluid (liquid or gas) to flow through it in only one direction while blocking flow in the opposite direction. While the preferred embodiment illustrates a ball check valve 34, it is within the terms of the present invention for any type of check valve to be used.

Typically, a check ball valve includes a check ball 34 which seats against a cylindrical shaped wall 40, see FIG. 6. Normally when drain water flow down into the inlet 26 of the drain basin 20, the check ball 34 sits at the bottom of the cage 32 and allows the drain water to flow from the outlet opening 22 of the drain basin 20 and through the drain pipe 18.

When pressurized fluid flows in the opposite direction, i.e., through the outlet opening 22, the check ball 34 is forced against the ball seat 42, sealing off any opening for fluid to pass around the ball. The ball seat 42 may include an O-ring seal forming a ball seat into which the ball 34 makes contact. The ball 34 is further contained in the fluid passage by a cage 32 that holds the ball while otherwise providing an open cross-sectional area to allow the drain fluid to flow from the outlet opening 22 of the drain basin 20 and through the drainpipe 18.

Figure 3:
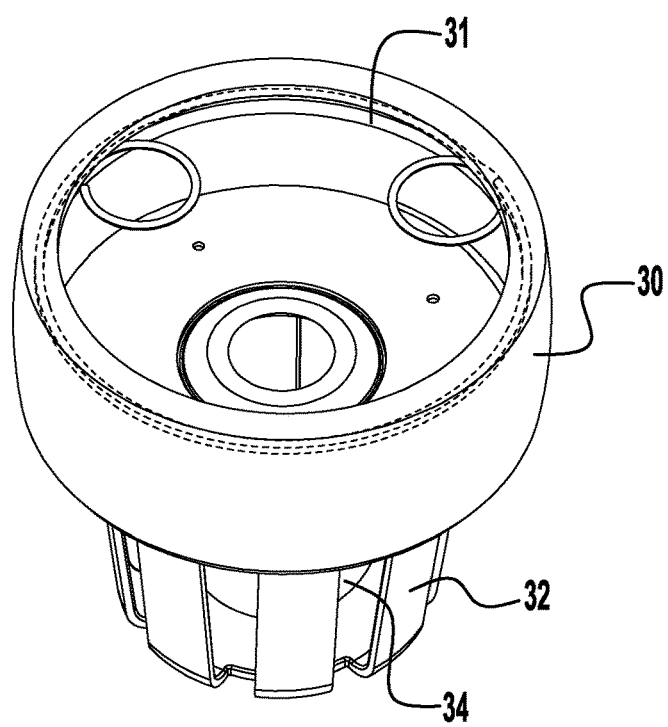
FIG. 3 is a front three-dimensional side view of the check valve floor drain in a closed condition, in accordance with the present invention.

The cylindrical housing 30, as shown in FIGS. 5 and 6, can be constructed of an elastic material, such as an elastomeric type polymer like rubber, that can be squeezed into a contracted condition. A circular spring 64, as best seen in FIGS. 2, 3, and 4, formed of a length of spring wire 66 is formed with at least a single coil and preferably two or more coils. Two circular loops 68 and 70 are provided, one at either end of the spring wire. The loops are provided for the user to insert their fingers to pull the two loops towards each other so that the diameter of the circular spring is reduced. The circular spring 64 can be inserted and secured in a groove 31 formed between the inlet 46 and the interior wall 36b of the cylindrical housing 30. The groove 31 is formed between the exterior wall 30a forming the inlet 46 of the housing 30 and a rim 30b projecting into the cylindrical housing and is adapted to secure the circular spring in place as shown in FIG. 6.

When the user insert's their fingers into the two loops 68 and 70 and pulls them towards each other, as shown in FIG. 2, so that the diameter of the circular spring is reduced, and the walls of the cylindrical housing 30 are squeezed into a contracted condition when the cylinder housing is inserted into the drain basin 20 and pressed against the interior inner wall 21 of the drain basin 20.

Once the cylindrical housing 30 is in place, the circular spring 64 can be released, as shown in FIG. 3, whereby the cylindrical housing expands and seals against the interior sidewall 21 of the drain basin 20.

Figure 7:
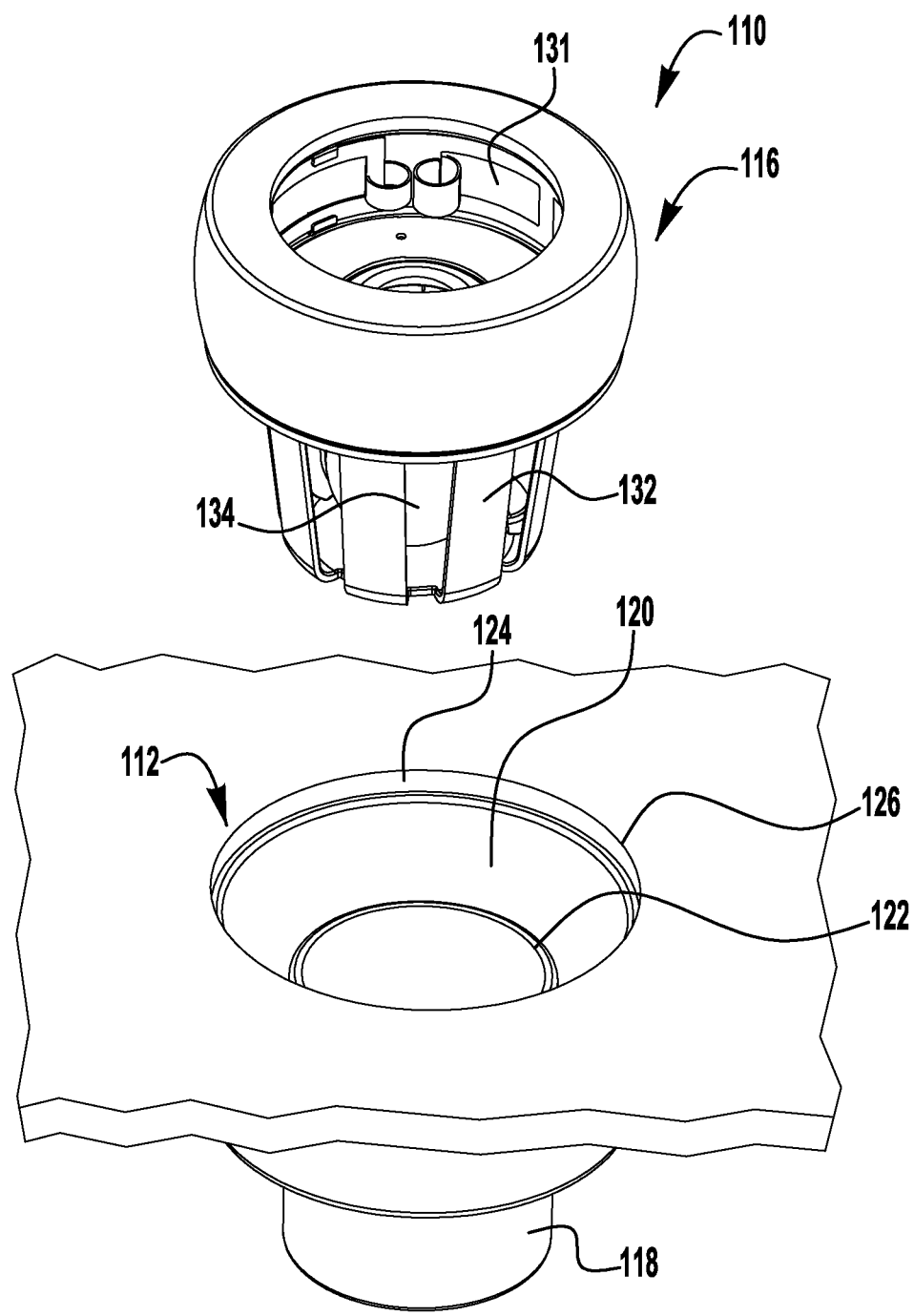
FIG. 7 is a three-dimensional side view of another embodiment of a check valve floor drain disposed above the floor drain into which it will be mounted, in accordance with the present invention.

Referring to FIG. 7, there is shown a second embodiment of a removable drain valve 116 designed to be removably insertable within a drain basin 120. The removable drain valve 116 is provided to prevent water backflow, trap water evaporation and sewer gas seepage through the drain basin 120 disposed within the floor drain 112 while still allowing free drainage function through a standard size drain pipe 118 extending downward from the outlet 122 of the drain basin 120. The drainpipe 118 is a pipe or tube that acts as a conduit between a house (or business) and the sewer system. The removable drain valve 16 can be removed from its operative location within interior sidewall 121 of the drain basin 120 for cleaning, inspection or testing, and repair of the floor drain assembly 110. The drain valve 116 may be constructed of any material, such as plastic or stainless steel for corrosion resistance. As described with regards, to the first embodiment, a grate cover (not shown) is seated within a groove 124 formed around the inlet 126 of the drain basin 120.

Figure 8:
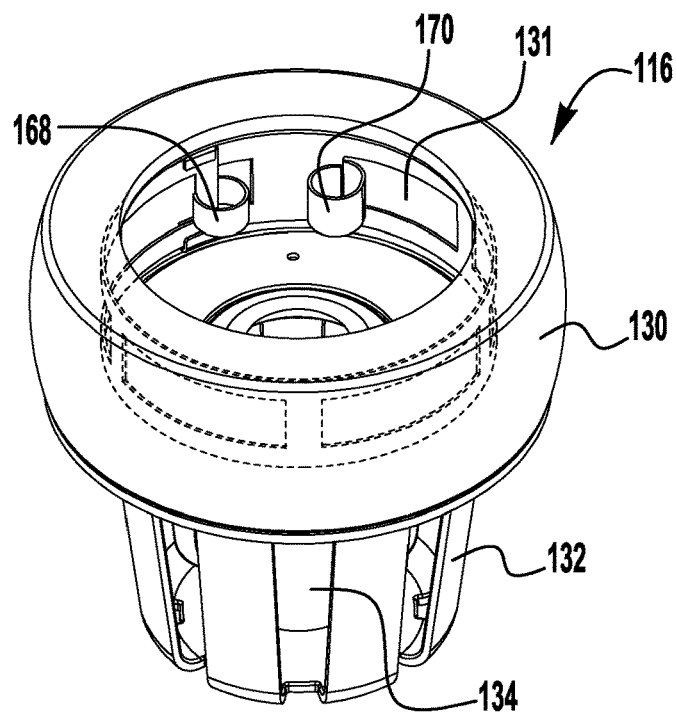
FIG. 8 is a three-dimensional view of the check valve floor drain in a closed condition, in accordance with the present invention.

Referring to FIG. 8, there is illustrated the removable drain valve 116 in an open condition where it is in a contracted state so as to be able to be inserted within the drain basin 120 adjacent the interior wall 121. Removable drain valve 116 includes a cylindrical housing 130 with a cage 132 containing a ball valve 34 mounted within the outlet 122 of the drain basin 120.

Figure 11:
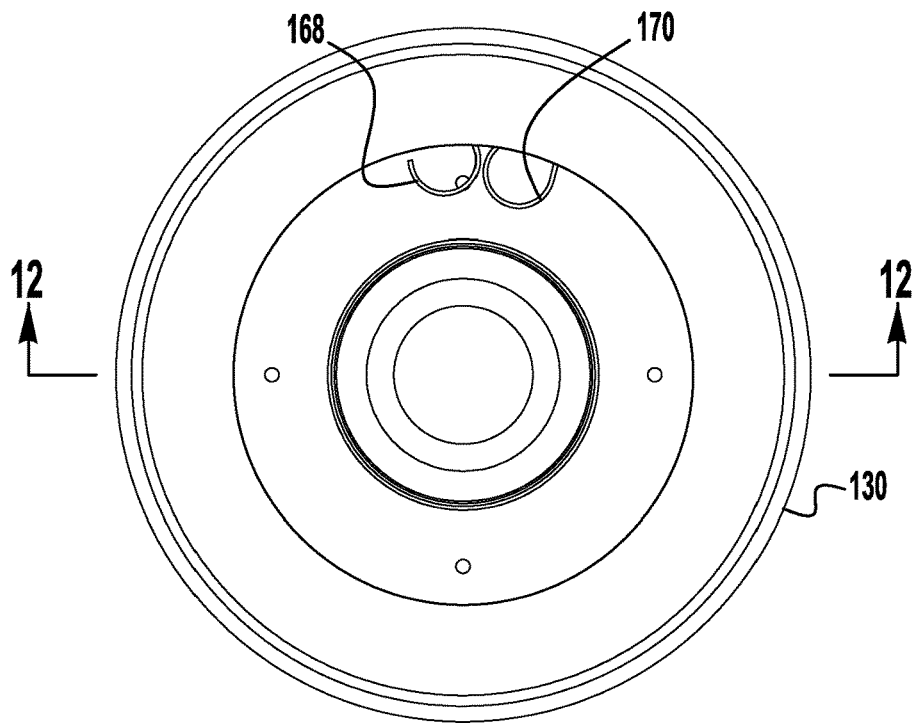
FIG. 11 is a top view of the check valve floor drain shown in FIG. 9 in a closed condition, in accordance with the present invention.
Figure 12:
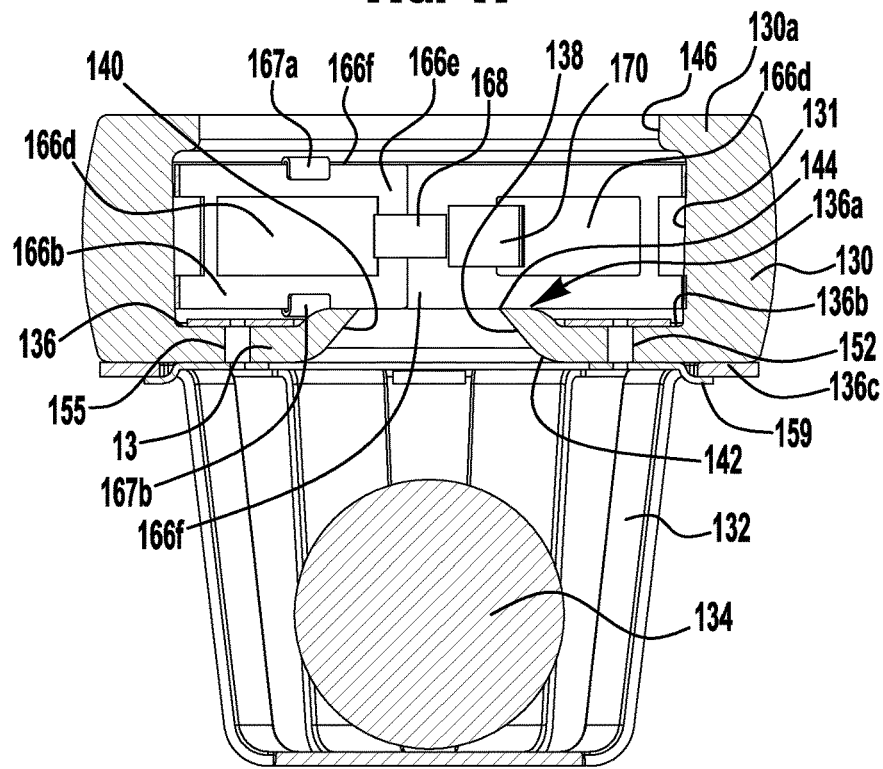
FIG. 12 is a side, cross sectional view through line 12-12 of FIG. 11, in accordance with the present invention.

As seen in FIGS. 11 and 12, the base portion of the cylindrical housing 130 includes a base wall 136 having a central opening 138 extending therethrough. The central opening 138 has a conical shaped wall 140 with an outer opening 142 that is larger than an inner opening 144 facing the inlet 146 of the housing 130. The ball valve 134 can either seat against the conical shaped wall 140 or at the intersection of the conical shaped wall and the outer opening 142.

Figure 10:
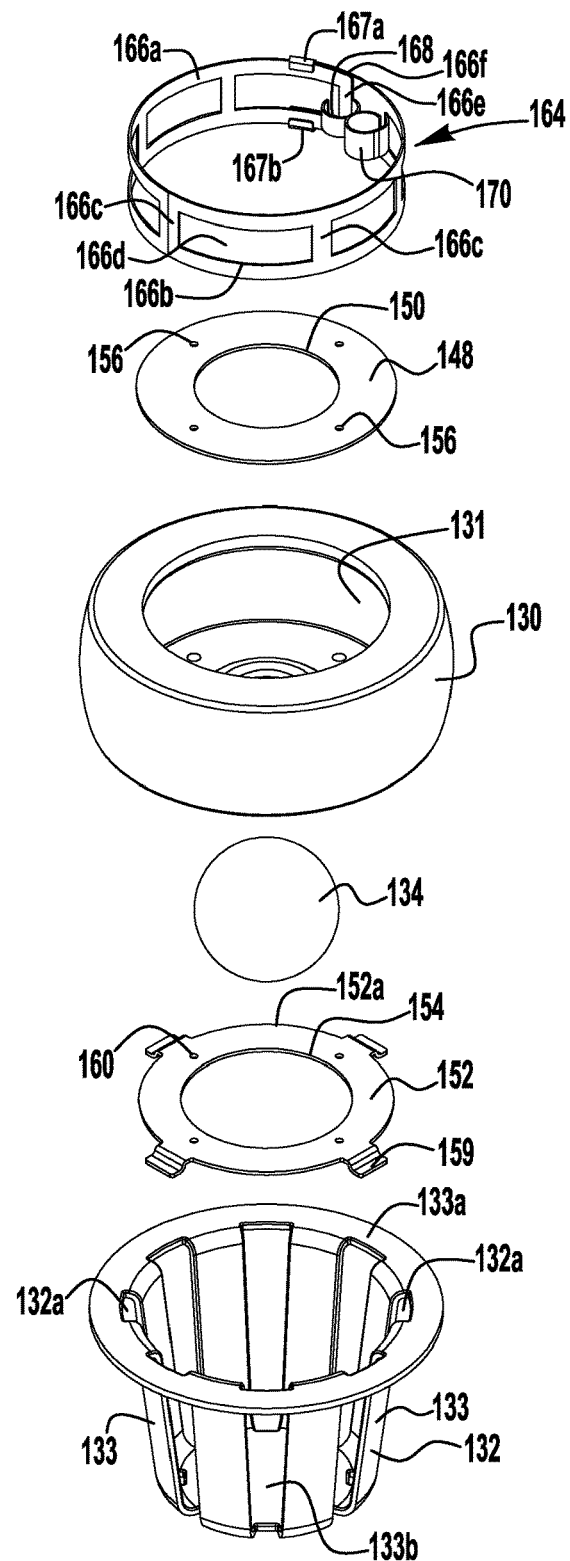
FIG. 10 is a side three-dimensional, exploded view of the embodiment of the check valve floor drain shown in FIG. 8, in accordance with the present invention.

As seen in FIGS. 10 and 11, a circular plate 148 has central opening 150 which receives the portion 136a of the base wall 136 that projects above the surface 136b of the base wall. An attachment plate 152 having a central opening 154 is mounted to the outer surface 136c of the base wall 136 by means such as rivets 155, as seen in FIG. 12, that are placed in a plurality of openings 156 through circular plate 148, a plurality of openings 158 through the base wall 136, and a plurality of openings 160 through attachment plate 152. The circular plate 148 and attachment plate 152, strengthen the base wall 136 to prevent any buckling when the ball valve 134 is seated against either the conical shaped wall 140 or at the intersection of the conical shaped wall and the outer opening 142.

The attachment plate 152 has a plurality of tabs 159 that extend outward from the outer edge 152a of the attachment plate and are sized to be received within notches 132a formed between the spaced walls 133 interconnecting the outer, circular shaped cage wall 133a and the bottom wall 133b which supports the ball 134 when it is not seated against cylindrical shaped wall 140, as shown in FIG. 12. When the cylindrical housing 130 is constructed, the attachment plate 152 is connected to the circular plate 148 with means such as rivets 55, as seen in FIG. 12, and the tabs 159 secure the cage 132 onto the housing 130.

The ball valve 134 acts as a check valve that normally allows fluid (liquid or gas) to flow through it in only one direction while blocking flow in the opposite direction. While the preferred embodiment illustrates a ball check valve 134, it is within the terms of the present invention for any type of check valve to be used.

Typically, a check ball valve includes a check ball 134 which seats against a cylindrical shaped wall 140, see FIG. 12. Normally when drain water flow down into the inlet 126 of the drain basin 120, the check ball 134 sits at the bottom of the cage 132 and allows the drain water to flow from the outlet opening 122 of the drain basin 120 and through the drainpipe 118.

When pressurized fluid flows in the opposite direction, i.e., through the outlet opening 122, the check ball 134 is forced against the ball seat 142, sealing off any opening for fluid to pass around the ball. The ball seat 142 may include an O-ring seal forming a ball seat into which the ball 134 makes contact. The ball 134 is further contained in the fluid passage by a cage 132 that holds the ball while otherwise providing an open cross-sectional area to allow the drain fluid to flow from the outlet opening 122 of the drain basin 120 and through the drainpipe 118.

The cylindrical housing 30, as shown in FIG. 12, can be constructed of an elastic material, such as an elastomeric type polymer like rubber, that can be squeezed into a contracted condition. A circular spring 164, as best seen in FIG. 10, formed of a strip 166 of spring wire having a circular loop 168 and 170 at either end. The strip 166 of spring wire can be formed of a single width of spring wire having an upper end 166a and a lower end 166b interconnected by a plurality of spaced legs 166c to form rectangular openings windows 166d. On one end 166e of the spring 164, a loop 168 is formed and projects out from an opening 166d and into the center of the spring. The opposite end 166f of the spring 164 has a loop 170 that is formed out of the strip and projects from an end of the window located adjacent the 166f of the spring 164. First and second tabs 167a and 167b are provided on the outer edges of the end 166f of the strip. The tabs 167a and 167b are bent over the upper end 166a and the lower ends 166b of the end 166e so that the circular spring 164 can be squeezed into a contracted condition. The circular spring 164, as best seen in FIG. 10, is formed of a length of spring strip 166 and has a circular loop 168 and 170 into which the user's fingers can be inserted to pull the two loops towards each other so that the diameter of the circular spring is reduced. The circular spring 164 can be inserted in a groove 131 formed between the inlet 146 and the interior wall 136b of the cylindrical housing 130.

The circular spring 164 can be inserted and secured in a groove 131 formed between the inlet 146 and the interior wall 136b of the cylindrical housing 130. The groove 131 is formed between the exterior wall 130a forming the inlet 146 of the housing 130 and the base wall 136. The groove 131 is adapted to secure the circular spring 164 in place as shown in FIG. 12.

Figure 9:
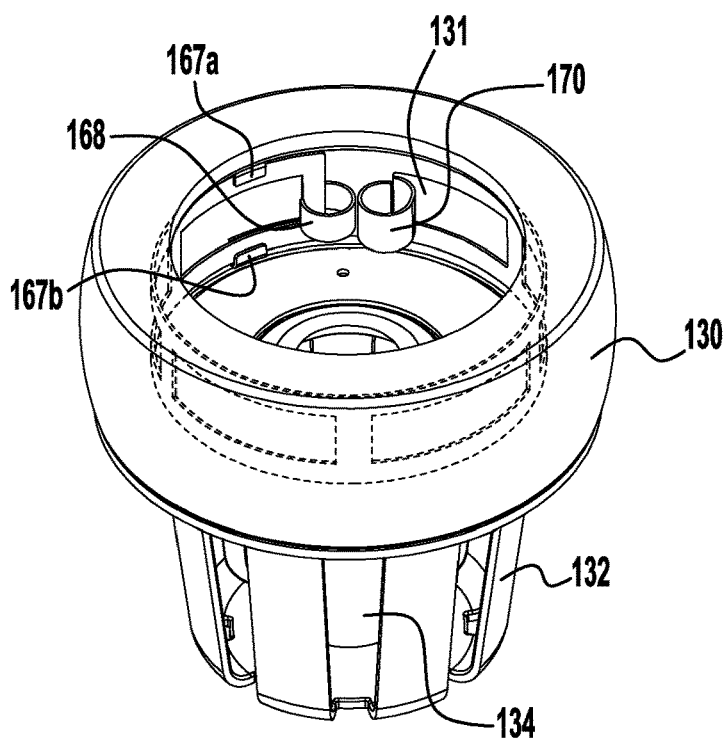
FIG. 9 is a three-dimensional side view of the check valve floor drain in an open condition, in accordance with the present invention.

When the user insert's their fingers into the two loops 168 and 170 and pulls them towards each other, as shown in FIG. 9, so that the diameter of the circular spring is reduced, and the walls of the cylindrical housing 130 are squeezed into a contracted condition when the cylinder housing is inserted into the drain basin 120. Once the cylindrical housing 130 is in place, the circular spring 64 can be released, as shown in FIG. 8, whereby the cylindrical housing expands and seals against the interior sidewall 121 of the drain basin 120.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A removable drain valve for insertion within an inlet opening of a drain basin;
   the removable drain valve having a cylindrical housing and cage with a check valve, the removable drain valve disposed within an outlet of the drain basin to allow drain water to flow out from the outlet of the drain basin while blocking flow from the outlet of the drain basin to the inlet opening of the drain basin;
   a circular spring formed of a length of spring wire, the circular spring having two circular loops, one at either end of the spring wire which are adapted for a user's fingers to be inserted to pull the two loops towards each other so that the diameter of the circular spring is reduced whereby outer walls of the cylindrical housing can be squeezed into a contracted condition when the cylinder housing is inserted into the drain basin and pressed against the interior inner wall of the drain basin; and
   whereby the two loops can return to their normal position whereby the diameter of circular spring is increased and thereby causes the cylindrical housing to expand into an expanded condition and seal against the drain basin.

2. The removable drain valve of claim 1 wherein the cylindrical housing is constructed of an elastic material that can be squeezed into a contracted condition.

3. The removable drain valve of claim 2 wherein the cylindrical housing is constructed of an
   elastomeric type polymer that can be squeezed into a contracted condition.

4. The removable drain valve of claim 2 wherein the circular spring is formed of two or more coils.

5. The removable drain valve of claim 4 further including:
a groove formed between the inlet and an interior wall of the cylindrical housing, wherein the circular spring is insertable and securable in the groove.

6. The removable drain valve of claim 5 wherein the groove is formed between an exterior wall forming the inlet of the cylindrical housing and a rim projecting into the cylindrical housing when the circular spring is inserted in the groove, whereby the groove can secure the circular spring within the cylindrical housing.

7. The removable drain valve of claim 4 wherein the cylindrical housing of the removable drain valve is pressed against an interior inner wall of the drain basin and the cage with a check valve is secured to the outlet of the cylindrical housing and disposed within the outlet opening of the drain basin.

8. The removable drain valve of claim 4 wherein the circular spring is constructed of spring wire biased to the expanded condition.

9. The removable drain valve of claim 8 wherein:
   the circular spring is in a contracted condition when the drain valve is inserted within the drain basin; and
   the circular spring is in an expanded condition when the drain valve is sealed within the drain basin.

10. A removable drain valve for insertion within an inlet opening of a drain basin;
- the removable drain valve having a cylindrical housing and cage with a check valve, the removable drain valve disposed within an outlet of the drain basin to allow drain water to flow out from the outlet of the drain basin while blocking flow from the outlet of the drain basin to the inlet opening of the drain basin;
- a circular spring formed of a strip of spring wire having a circular loop at either end of the strip of spring wire which are adapted for a user's fingers to be inserted to pull the two loops towards each other so that the diameter of the circular spring is reduced whereby outer walls of the cylindrical housing can be squeezed into a contracted condition when the cylinder housing is inserted into the drain basin and pressed against the interior inner wall of the drain basin; and
- whereby the two loops can return to their normal position whereby the diameter of circular spring is increased and thereby causes the cylindrical housing to expand into an expanded condition and seal against the drain basin.

11. The removable drain valve of claim 10 wherein the strip of spring wire is formed of a single width of spring wire having an upper end and a lower end interconnected by a plurality of spaced legs to form rectangular shaped window openings.

12. The removable drain valve of claim 11 wherein:
- a first end of the strip of spring wire has a first loop which projects out from a window shaped opening and into a center of the spring; and
- a second end of the strip of spring wire has a second loop formed out of the strip and projecting from an end of a window shaped opening located adjacent the second end of the spring.

13. The removable drain valve of claim 12 further including:
- a groove formed between an inlet and an interior wall of the cylindrical housing adapted to secure the circular spring in place within the cylindrical housing.

14. The removable drain valve of claim 13 wherein:
- first and second tabs are provided on outer edges the first end of the strip, the first and second tabs being bent over the upper end and the lower end of the second end of the strip so that the circular spring can be squeezed into a contracted condition.

15. The removable drain valve of claim 14 wherein the second end of the strip is movably received between the first and second tabs when the circular spring expands and the first and second ends of the circular spring separate from each other and when the circular spring contracts and the first and second ends of the circular spring move towards each other.

16. The removable drain valve of claim 10 wherein the cylindrical housing is constructed of an elastic material that can be squeezed into a contracted condition.

17. The removable drain valve of claim 16 wherein the cylindrical housing is constructed of an elastomeric type polymer that can be squeezed into a contracted condition.

18. The removable drain valve of claim 10 wherein the cylindrical housing of the removable drain valve is pressed against an interior inner wall of the drain basin and the cage with a check valve is secured to the outlet of the cylindrical housing and disposed within the outlet opening of the drain basin.

19. The removable drain valve of claim 10 wherein the circular spring is constructed of a strip of spring wire biased to the expanded condition.

20. The removable drain valve of claim 19 wherein:
- the circular strip of spring wire is in a contracted condition when the drain valve is inserted within the drain basin; and
- the circular strip of spring wire is in an expanded condition when the drain valve is sealed within the drain basin.

* * * * *